United States Patent [19]
Koroljow et al.

[11] Patent Number: 6,154,552
[45] Date of Patent: Nov. 28, 2000

[54] HYBRID ADAPTIVE BEAMFORMER

[75] Inventors: Walter S. Koroljow, Vienna, Va.; Gary L. Gibian, Potomac, Md.

[73] Assignee: Planning Systems Inc., McLean, Va.

[21] Appl. No.: 09/078,612

[22] Filed: May 14, 1998

Related U.S. Application Data
[60] Provisional application No. 60/046,534, May 15, 1997.

[51] Int. Cl.[7] .............................. H04R 25/00; H04R 3/00; H04B 15/00; G01S 3/80
[52] U.S. Cl. ........................... 381/313; 381/312; 381/92; 381/94.1; 367/119; 367/121; 367/125
[58] Field of Search ..................................... 381/312, 313, 381/317, 94.1, 94.2, 94.7, 92; 367/119, 125, 87, 103, 126, 118

[56] References Cited

U.S. PATENT DOCUMENTS

| | | | |
|---|---|---|---|
| 5,581,495 | 12/1996 | Adkins et al. | 708/319 |
| 5,627,799 | 5/1997 | Hoshuyama | 367/121 |
| 5,825,898 | 10/1998 | Marash | 381/92 |

OTHER PUBLICATIONS

Martin Kompis, "A Combined Fixed/Adaptive Beamforming Noise–Reduction System for Hearing Aids," Proceedings of the 20th Annual International Conference of the IEEE Engineering in Medicine and Biology Society, vol. 20, No. 6, 1998 pp. 3136–3139.

Julie E. Greenberg and Patrick M. Zurek, "Evaluation of an adaptive beamforming method for hearing aids", Journal of Acoustical Society of America, vol. 91, No. 3, Mar. 1992, pp. 1662–1676.

Gerald L. Fudge et al., "A Calibrated Generalized Sidelobe Canceller for Wideband Beamforming," *IEEE Transactions on Signal Processing*, vol. 42, No. 10, Oct. 1994, pp. 2871–2875.

R.J.M. van Hoesel et al., "Evaluation of a Portable Two–Microphone Adaptive Beamforming Speech Processor with Cochlear Implant Patients," *J. Acoust. Soc. Am.* 97 (4)), Apr. 1995, pp. 2498–2503.

Julie E. Greenberg et al., "Evaluation of an Adaptive Beamforming Method for Hearing Aids," *J. Acoust. Soc. Am.* 91 (3), Mar. 1992, pp. 1662–1676.

Victor E. DeBrunner et al., "A Directional Adaptive Least––Mean–Square Acoustic Array for Hearing Aid Enhancement," *J. Acoust. Soc. Am.* 98 (1), Jul. 1995, pp. 437–444.

Birger Kollmeier et al., "Speech Enhancement Based on Physiological and Psychoacoustical Models of Modulation Perception and Binaural Interaction," *J. Acoust. Soc. Am.* 95 (3), Mar. 1994, pp. 1593–1602.

Mead C. Killion, "Where Are We Now? A 30–Year Perspective on Hearing Aid Developments," Acoustical Society of America, Nov. 28, 1995., pp. 1–2.

(List continued on next page.)

*Primary Examiner*—Forester W. Isen
*Assistant Examiner*—Brian Tyrone Pendleton
*Attorney, Agent, or Firm*—Kenyon & Kenyon; David L. Zibelli

[57] ABSTRACT

The hybrid adaptive beamformer of the present invention includes a plurality of microphones for receiving sound energy from an external environment and for producing a plurality of microphone outputs from the sound energy. A processor produces a plurality of first order beams based on the microphone outputs. The processor determines an amount of reverberation in the external environment and adaptively produces a second order output beam taking into consideration the determined amount of reverberation. The processor may determine the amount of reverberation based on a comparison of the first order beams. The processor may produce the second order output beam by adaptively combining the plurality of first order beams, as further described below, or by adaptively combining the microphone outputs. The adaptation varies taking into consideration the determined amount of reverberation. Alternatively, the adaptation may vary by measuring the signal-to-noise ratio of the first order beams and adaptively combining the first order beams based on the determined signal-to-noise ratios.

22 Claims, 10 Drawing Sheets

OTHER PUBLICATIONS

J.E. Greenberg et al., "Intelligibility–Weighted Measures of Speech–to–Interference Ratio and Speech System Performance," *J. Acoust. Soc. Am.* 94 (5) Nov. 1993, pp. 3009–3010.

R.W. Stadler et al., "On the Potential of Fixed Arrays for Hearing Aids," *J. Acoust. Soc. Am.* 94 (3) Pt. 1, Sep. 1993, pp. 1332–1342.

James M. Kates, "Superdirective Arrays for Hearing Aids," *J. Acoust. Soc. Am.* 94 (4), Oct. 1993, pp. 1930–1933.

Wim Soede et al., "Directional Hearing Aid Based on Array Technology," *Scand. Audiol.* 1993, Suppl. 38, pp. 20–27.

Reinier Plomp, "Noise, Amplification, and Compression: Considerations of Three Main Issues in Hearing Aid Design," *Ear and Hearing*, vol. 15, No. 1, Feb. 1994, pp. 1–12.

James M. Kates et al., "A Comparison of Hearing–Aid Array–Processing Techniques," *J. Acoust. Soc. Am.* 99 (5), May 1996, pp. 3138–2390.

James M. Kates, "Relating Change in Signal–To–Noise Ratio to Array Gain for Microphone Arrays Used in Rooms," *J. Acoust. Soc. Am.* 101 (4), Apr. 1997, pp. 2388–2390.

HYBRID ADAPTIVE BEAMFORMER

Provisional application No. 60/046,534 filed May 15, 1997.

This invention was made with government support under 1-R44-AG13515-02 awarded by the National Institute on Aging. The Government has certain rights in the invention.

FIELD OF THE INVENTION

The present invention relates to a beamformer, and in particular to a hybrid adaptive beamformer. The hybrid adaptive beamformer may be used with a hearing aid or other device.

BACKGROUND OF THE INVENTION

It has long been recognized that amplification, no matter how non-linear and sophisticated, can improve speech comprehension in devices such as hearing aids only so much. Further progress depends on increasing the signal-to-noise ratio (SNR) of the hearing aid output. In general, the hearing-impaired need higher SNR than normal to understand speech. This need arises not only from hearing damage, but also as a necessary consequence of aging. For both men and women aged 70–79, fully 25% of this population may need 5.9 dB more SNR to hear normally. The requirements for 50% of the population aged 80–89 have been reported to be 7.0 dB for men and 5.6 dB for women. These numbers understate the problem by excluding hearing damage. Statistics in the literature are consistent with the hypothesis that the extra SNR requirement for the population at large is 50% greater than the numbers above. It should be borne in mind that these statistics apply to the entire population, not just the "hearing impaired".

The extra SNR requirements above are substantial. Each dB of SNR may improve the sentence intelligibility score by 15–20%. A hearing loss of 6–8 dB implies that people are not able to understand a speaker when a competing speaker is present at about the same distance from the listener. Any hearing loss at all implies loss of understanding when multiple competing speakers create an interference field equal in level to the targeted speaker. The inability to function normally in the common situations above can have a devastating effect on people's social life and outlook. The ill effects of this form of hearing loss are not confined to the aged. For example, anecdotal evidence abounds of the distress caused by the inability to hear multiple speakers at business meetings and lunches.

Many attempts have been made to increase signal to noise ratio for hearing aid users. Attempts to do so by frequency filtering have been unsuccessful, and in fact usually counterproductive because the frequencies to be filtered out are usually those of other speakers. These are precisely the frequencies needed to understand the speaker of interest. More recent attempts have focused on directional hearings aids with maximum sensitivity in the direction the user faces. Two types of aids have been considered: directional microphones and multiple microphones with beamforming.

Typical directional microphones produce 1–2 dB of intelligibility weighted gain for a diffuse noise field with exceptional microphones producing on the order of 4 dB. This is helpful, but not enough for the typical subject. Directional microphones can however synergistically provide inputs to beamformers. For example, if directional microphones attenuate an interferer by 2 dB, the problem confronting the beamformer has been reduced in severity by 2 dB.

Several types of beamformers have been used in an attempt to improve such hearing aids, but none have as yet produced satisfactory results. For example, fixed weight beamformers have been used. Such fixed weight beamformers sum weighted microphone outputs with weights constant in time. Fixed weight beamformers can provide only about 5 dB of intelligibility weighted gain in a diffuse noise field. Using fixed weights and five directional microphones, perhaps 7 dB is possible in a diffuse noise field.

Superdirective beamformers use large weights of different sign for summing microphone outputs. Use of superdirective beamformers can give perhaps 11 dB of intelligibility weighted gain with an eyeglass temple mounted array. There are two drawbacks to the technique: 1) it is sensitive to errors in construction, processing, and assumptions about the noise field; and 2) it can require focusing (taking into account the distance to the subject of interest) of the array to avoid distortion. Use of such superdirective beamformers requires careful tradeoffs between robustness and performance. These tradeoffs may significantly reduce the performance possible.

Adaptive beamformers have also been used. Such adaptive beamformers do not use weights constant in time. Rather, the weights change as required to maintain sensitivity in the desired direction and to minimize sensitivity in the direction of noise sources. Such adaptive beamformers can produce good results in anechoic environments with point interferers: 25–30 dB and more of intelligibility weighted gain are possible. Adaptive beamformers outperform fixed weight beamformers in the case of anisotropic diffuse noise because fixed weight beamformers are optimized for isotropic noise whereas adaptive beamformers optimize themselves for any anisotropic diffuse noise. Performance against isotropic diffuse noise is the same as that of fixed weight beamformers. Their major drawback is poor performance in reverberant environments. In such an environment, they can even degrade the signal and achieve a negative intelligibility weighted gain.

SUMMARY OF THE INVENTION

The hybrid adaptive beamformer of the present invention includes a plurality of microphones for receiving sound energy from an external environment and for producing a plurality of microphone outputs from the sound energy. A processor produces a plurality of first order beams based on the microphone outputs. The processor determines an amount of reverberation in the external environment and adaptively produces a second order output beam taking into consideration the determined amount of reverberation. The processor may determine the amount of reverberation based on a comparison of the first order beams. The processor may produce the second order output beam by adaptively combining the plurality of first order beams, as further described below, or by adaptively combining the microphone outputs. The adaptation varies taking into consideration the determined amount of reverberation. Alternatively, the adaptation may vary may vary, by determining at least one of an amount of reverberation in the external environment and a signal-to-noise ratio and adaptively combining the first order beams based on the determined at least one of the amount of reverberation and the signal-to-noise ratio.

BRIEF DESCRIPTION OF THE DRAWINGS

The above and further objects and advantages of the present invention will become clear from the following description of preferred embodiments taken in conjunction with the following drawings, in which like reference numerals refer to like elements, and wherein.

DETAILED DESCRIPTION OF PREFFERED EMBODIMENTS

While the preferred embodiments of the invention are described in detail herein, with specific reference to certain illustrative embodiments, it is to be understood that there is no intent to be limited to those embodiments. On the contrary, the aim is to cover all modifications, alternatives and equivalents falling within the spirit and scope of the invention.

The Hybrid Adaptive Beamformer (HAB) of the present invention is a multimicrophone beamformer. It may include a hearing aid designed to increase speech comprehension in noise. It has demonstrated performance never before achieved by a single device. The HAB has: (1) interferer rejection comparable to that shown in previous studies in the absence of reverberation, such as the intelligibility weighted gain of 25–30 dB found in beamformers when a target is present; (2) performance in reverberation comparable to that of previously studied beamformers with fixed weights; and (3) better interferer rejection than previous devices (with adaptive beamformers) when significant reverberation is present, e.g., significantly better than the intelligibility weighted gain of 10 dB.

Figure 1:
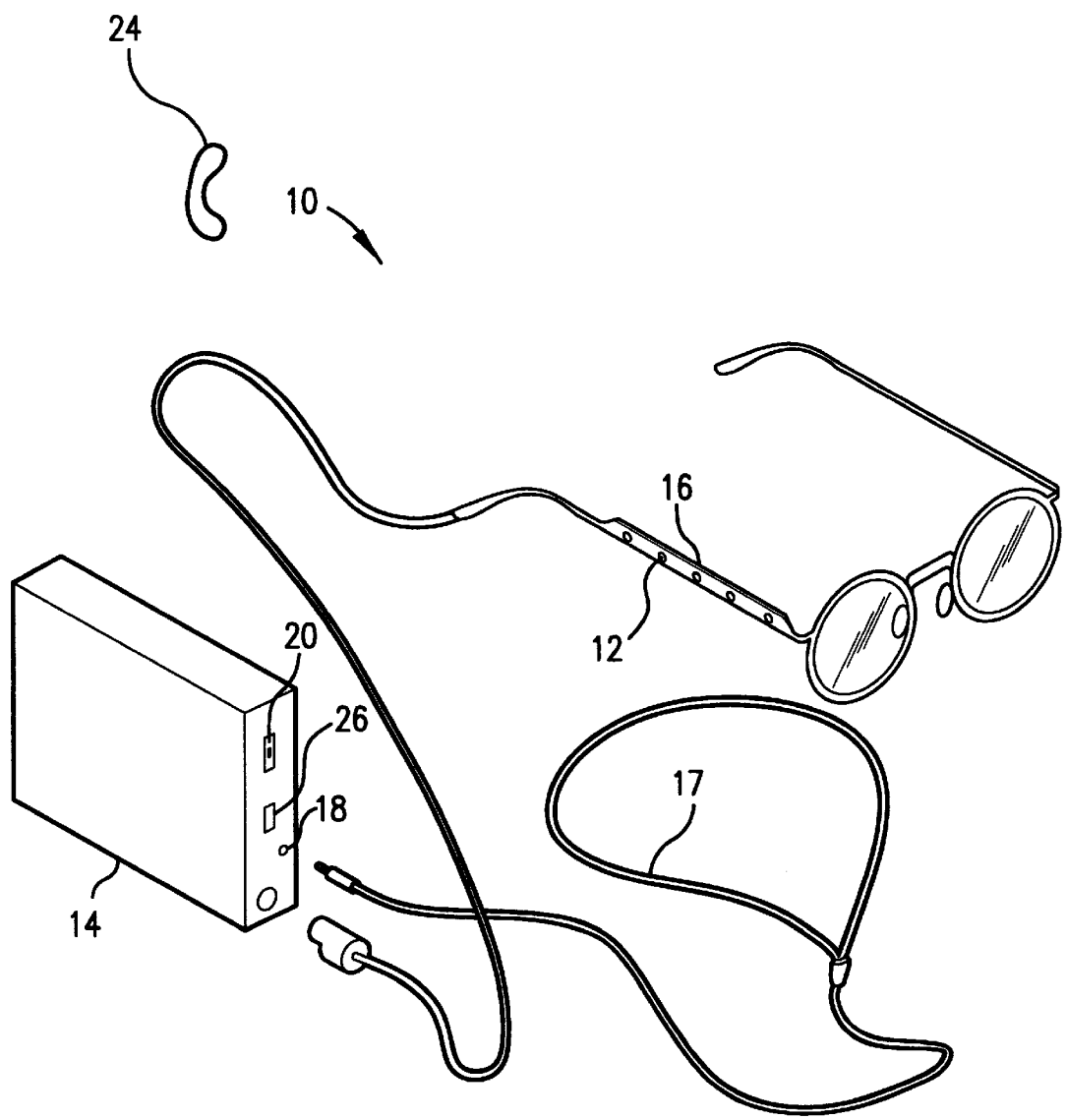
FIG. 1 is a diagram illustrating the hybrid adaptive beamformer of the invention.

The hybrid adaptive beamformer 10 is illustrated in FIG. 1 and may include a plurality of microphones 12 for receiving sound energy from an external environment and for producing a plurality of microphone outputs from the sound energy. A processor 14 produces a plurality of first order beams based on the microphone outputs. The processor 14 determines an amount of reverberation in the external environment and adaptively produces a second order output beam taking into consideration the determined amount of reverberation. The processor 14 determines the amount of reverberation based on a comparison of the first order beams. The processor 14 may produce the second order output beam by adaptively combining the plurality of first order beams or by adaptively combining the microphone outputs, as further described below. The adaptation varies taking into consideration the determined amount of reverberation.

Alternatively, the processor 14 may vary the amount of adaptation by determining at least one of an amount of reverberation in the external environment and a signal-to-noise ratio and adaptively combining the first order beams based on the determined at least one of the amount of reverberation and the signal-to-noise ratio. The signal-to-noise ratio is determined with the signal being the sound power at the microphones of the source the HAB is aimed at and the noise being all other sound power at the microphones.

Adapting by combining beams may have unique advantages over combining microphone outputs. For example, a small adaptation may substantially change the character of the HAB output since it may be used to modify beam responses where their response is already small (in regions of undesired sensitivity). At the same time, the small adaptation may leave areas of high response essentially unchanged. These characteristics would, for example, enable the HAB 10 to eliminate undesired interference with minimal effect on directions of desired sensitivity. In general, achieving a large effect with a small adaptation may be useful in minimizing the various undesired effects of adaptation.

The HAB 10 may consist of a multi-microphone array mounted in an eyeglass temple 16 and a belt wearable processor 14. The processor could be coupled to a subject's existing hearing aid by an induction loop 17 around the neck or it could include its own hearing aid 24. Alternatively, the processor may be coupled to a hearing aid by other well known techniques such as RF coupling, wires, etc.

A typical hearing impaired subject with a hearing loss in noise of 7 dB with this hearing aid with the HAB 10 would function better than a normal-hearing person in an anechoic ("dead") or moderately reverberant room. In fact, in a dead room with one or two interferers, he would function dramatically better than normal, and significantly better than normal in a moderately reverberant room with the interferers behind him. Performance in a live room yields a 7-dB reduction in the reverberant field and 5–11 dB rejection of a point interferer. Performance of the HAB is discussed further below with reference to FIG. 's 3–12.

A few standard terms will now be defined: A device combining the outputs of microphones is called a beamformer. An important measure of performance for a beamformer is gain, which is the increase in signal to noise ratio obtained by using the beamformer. Gain may vary as a function of frequency and therefore for speech intelligibility, we use intelligibility weighted gain. This is computed by weighting the beamformer gain at various one-third-octave bands and taking the sum (ANSI, 1969). Gain can be against interference in the form of a diffuse noise field or in the form of point interferers. The gain against a diffuse noise field is the gain against a point interferer averaged over the position of the interferer.

Beams are outputs produced by combining outputs of multiple microphones. They can be viewed as the output produced by combining microphones into a single directional microphone. Proper combination of microphones gives a desired directional response called a beampattern. The process of producing beams is called beamforming. The device producing beams is called a beamformer. Several beams, pointing in different directions, can be produced simultaneously from the same set of microphone signals by multiplying the microphone signals by different sets of beamformer coefficients. A jammer is a point interferer. The target is the source the user wants to hear.

The hybrid adaptive beamformer 10 combines the good qualities of a fixed weight beamformer and an adaptive beamformer. Under anechoic conditions, the HAB 10 functions as an adaptive beamformer with 25–30 dB of intelligibility weighted gain against several point interferers. In anisotropic diffuse noise, it optimizes itself almost completely to reject the noise field. This performance demonstrates the advantages of the hybrid adaptive beamformer 10. However, in very reverberant conditions it typically produces 7–11 dB intelligibility weighted gain against a point interferer and in mild reverberation it produces 8–11 dB against a point interferer. In these conditions the HAB 10 demonstrates the advantages of a fixed weight beamformer.

Figure 2:
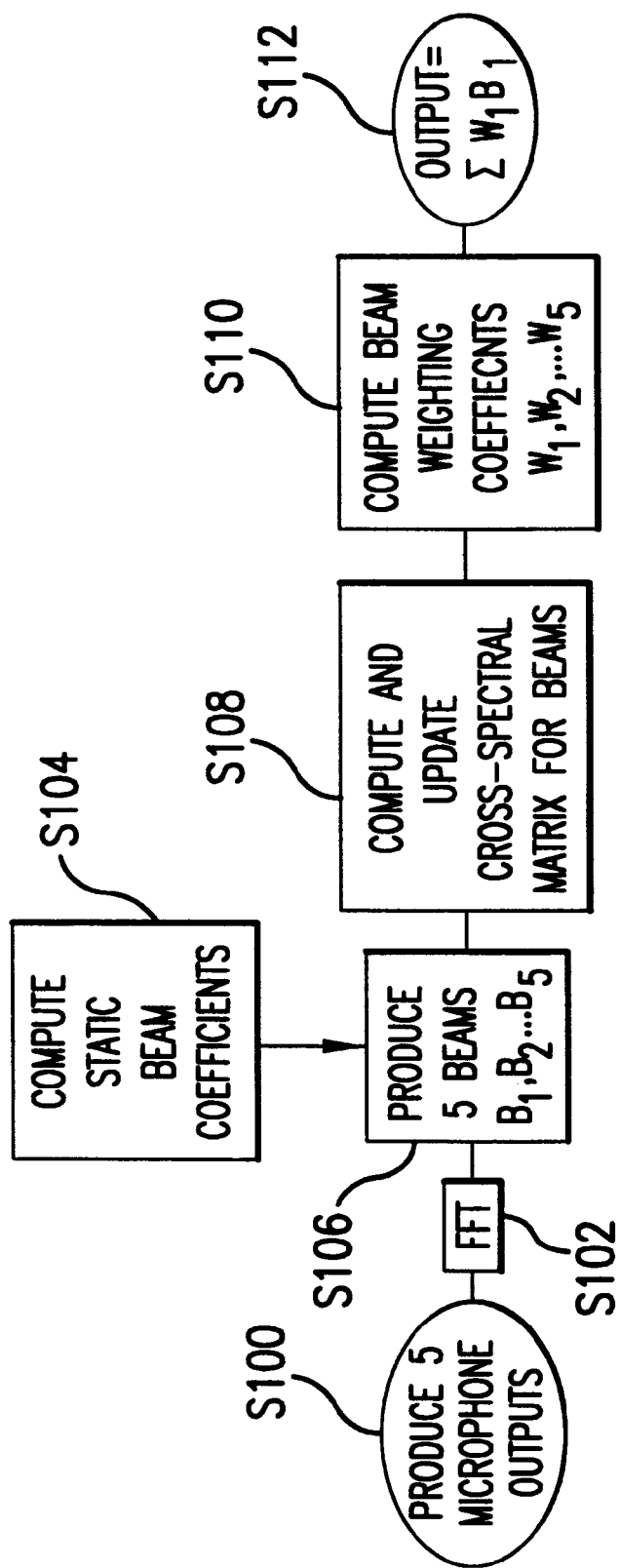
FIG. 2 is a flowchart illustrating components of the hybrid adaptive beamformer of the invention.

FIG. 2 is a flowchart that illustrates functioning of the HAB 10. In step S100 5 microphone outputs are produced. The microphone outputs are processed in step S102 in the frequency domain by passing the microphone outputs through a Fast Fourier Transform. A preferred transform is a short 128-point transform (approximately 200 transforms per second) to maximize the number of independent points available when the cross spectral matrix is later integrated.

In step S104 static beam coefficients are produced. The beams are defined as part of the system design and are never changed. In step S106 the static beam coefficients are used to produce the beams (B1–B5). The design of these beams is important with several factors to consider: 1) the directional response (beampattern) of the beam, and 2) the tradeoff between robustness and superdirective performance. The beams are designed with the assumption of processing errors with standard deviations of 0.5 dB in amplitude and 3 degrees in phase. The beams are optimized for far-field response.

Figure 6:
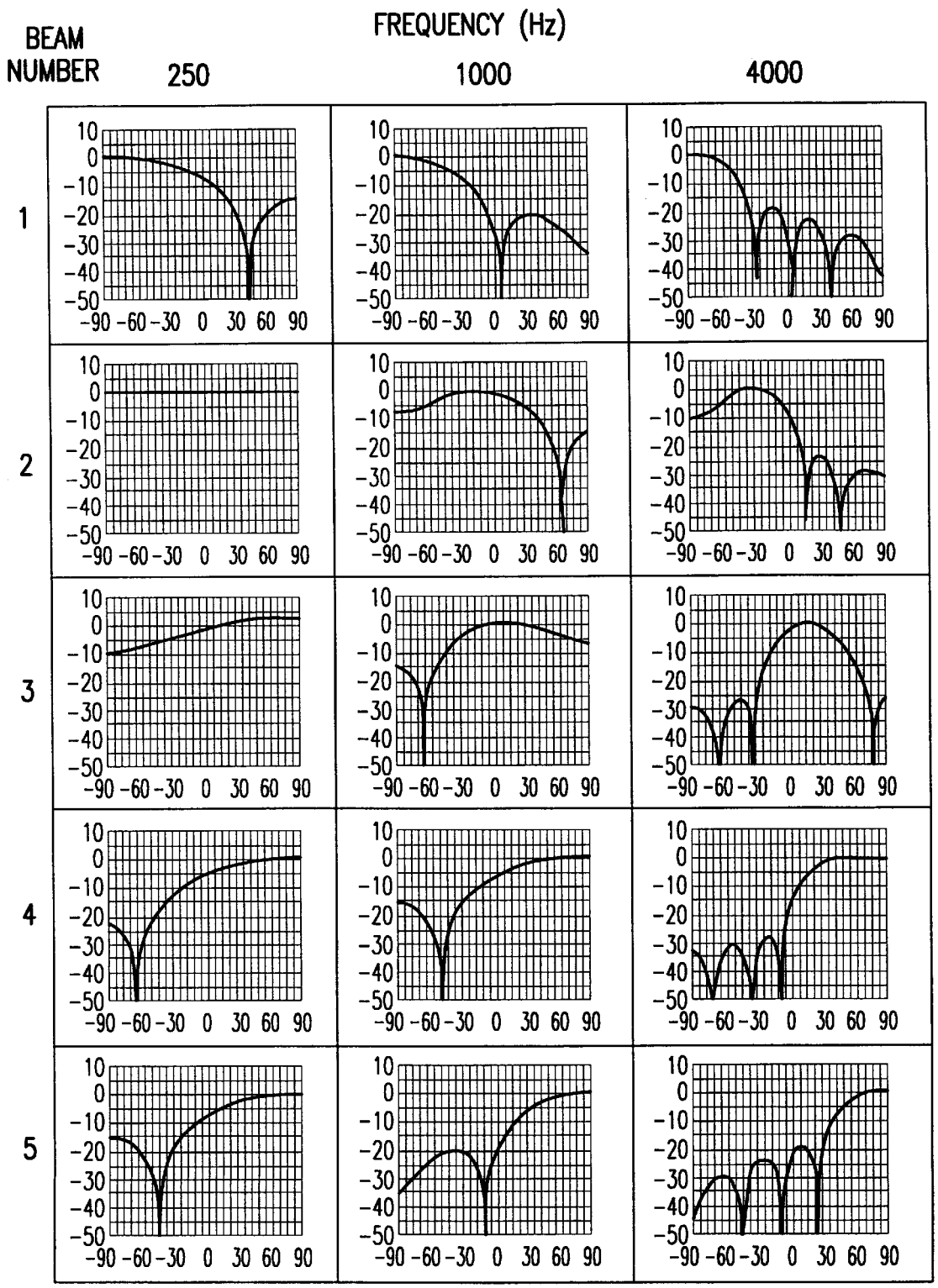
FIG. 6 illustrates selected beampatterns used by the hybrid adaptive beamformer of the invention.

FIG. 6 shows, at selected frequencies, some of the preferred beampatterns (directional responses, dB vs. angle in degrees, where –90 degrees is straight ahead for HAB users) of the beams produced. Their significance is explained below.

In step S108, the Cross-Spectral-Matrix (CSM) is computed and updated. It is the integral, at different frequencies, which estimates the correlation among the five beams. The adaptation time of the HAB 10 depends on the method of updating the CSM. A preferred method is to use a rolling 1.5-second integral to estimate the CSM. This gives a 1.5 second adaptation time to the HAB 10. It also contains about 100 independent points for each frequency giving a good statistical estimate of the CSM. The CSM is an implementation in the frequency domain. Alternatively, the invention could be implemented in the time domain by methods known to those of ordinary skill in the art.

In step S110 the beam weighting coefficients are computed. It is desirable for the HAB 10 to produce an output (or second order) beam at step S112 which gives unity response along the axis of the beamformer and which minimizes the power output of the HAB 10 subject to the restrictions discussed below. This adaptive beam is to be a weighted sum of the five fixed-weight beams. While the above description indicates that five beams are produced with five weighting coefficients, a different number of beams and coefficients could be used as required.

FIG. 6 shows, at selected frequencies, some of the preferred beampatterns (directional responses, dB vs. angle in degrees, where –90 degrees is straight ahead for HAB users) of the beams produced. Their significance is explained below.

The HAB 10 becomes a superdirective beamformer when completely restricted. The first beam is chosen to be the superdirective "default" beam. For complete restriction, the first beam has a weight of 1 and the other weights are zero. In other words, beams 2 through 5 are suppressed. We suppress beams 2–5 by telling the adaptation algorithm that beams 2–5 contain (fictitious) uncorrelated noise. The adaptation algorithm, in minimizing total noise (actual noise+ fictitious noise) in the output, incorporates beams 2–5 to cancel actual noise if and only if this results in a reduction in actual noise which is greater than the increase in fictitious noise.

Quantitatively, this is done by modifying the diagonal of the CSM (for each frequency). Let us pick and fix a frequency. The following discussion will assume this frequency and not mention it. All other frequencies can be handled the same way. "Beam" now refers to the complex frequency component of a beam at this chosen frequency. Let the components of the CSM be given by $R_{ij} = \langle b_i b_j \rangle$ =time average of the $i^{th}$ beam and complex conjugate of the $j^{th}$ beam =cross-spectrum of beams i and j at the chosen frequency Let $d_i$=value of beampattern of $i^{th}$ beam in the forward direction along the axis of the beamformer.

$w^i$=complex weight to be applied to the $i^{th}$ first order beam to produce $2^{nd}$ order beam Diag $(x_1, x_2, x_3, \ldots)$ diagonal matrix with $x_1, x_2, \ldots$ along the diagonal One method of implementing the HAB is to modify the CSM to be:

$$R' = R + S \, diag(O, R_{22}, R_{33}, R_{44}, R_{55}) = R + SD$$

Where S is a number which is a measure of the restriction we apply to the beamformer's adaptation.

We then solve the mathematical problem:

Minimize $w^t (R+SD)w$ where $w^t$ is the hermitian conjugate of w

Subject to $w^t d = 1$.

The constraint $w^t d = 1$ ensures that the $2^{nd}$ order beam's beampattern has the value 1 in the forward direction.

This problem has the well-known solution:

$$w = \frac{(R+SD)^{-1} d}{d^+ (R+SD)^{-1} d}.$$

This formula exhibits explicitly how the weights w depend on the control variable S.

The expected value for the interbeam correlation for an anechoic environment is defined as C. Then, the following chart illustrates a sample adaptation that the HAB may generate based on the determined amount of reverberation.

SAMPLE ADAPTATION ADJUSTMENT

| Interbeam Correlation | Reverberation | Adaptation | S |
|---|---|---|---|
| $\leq C$ | Low | High | 0.01 |
| $\sim \sqrt{C}$ | Medium | Medium | 0.3 |
| $\sim 1$ | High | Low | 10.0 |

The following chart illustrates a sample adaptation that the HAB may generate based on the determined amount of reverberation and signal-to-noise ratio. The beam power ratio is the power of beam 1 (the default beam) to the average power of the correction beams.

SAMPLE ADAPTATION ADJUSTMENT

| Beam Power Ratio | Interbeam Correlation | SNR | Reverberation | Adaptation | S |
|---|---|---|---|---|---|
| <<1 | $\leq C$ | Low | Low | Full | 0.01 |
| >>1 | $\leq C$ | High | Low | Medium | 0.1 |
| ~1 | $\leq C$ | Medium | Low | Full | 0.01 |
| <<1 | $\sim \sqrt{C}$ | Low | Medium | Full | 0.0 |
| >>1 | $\sim \sqrt{C}$ | High | Medium | Medium | 0.1 |
| ~1 | $\sim \sqrt{C}$ | Medium | Medium | Full | 0.01 |
| <<1 | ~1 | Low | High | Full | 0.01 |
| >>1 | ~1 | High | High | None | 10.0 |
| ~1 | ~1 | Medium | High | Medium | 0.1 |

As discussed later, S can be programmed into the HAB or S can be set by the user. If S=0, there is no restriction to the adaptation and we have a purely adaptive beamformer. If S=infinity, beams 2–5 are completely suppressed, and we have a purely superdirective beamformer. If S has some intermediate value, say 0.1, then one of the beams 2–5 will be involved in suppressing noise adaptively if the resulting noise reduction is greater than 0.1 D(l) per unit increase in the beam weight. But D(l) is the beam aimed at the target and its value is approximately the strength of the target. Roughly speaking, adaptation will take place if the noise to be reduced is greater than 0.1 times the target noise, or greater than 10 dB below the target.

The interpretation of S above is only approximate for many reasons. D(l) is not really the target strength, because the first beam responds to many sound sources, even if at reduced sensitivity. As an example, the first beam may respond more to the total reverberant field of a room than to the target. In addition, the crucial values are the noise powers in the outputs of the beams, and they depend on the exact placement of the sources as well as the reverberant field. Nevertheless, the interpretation of S given above is very useful as a guide for the intuition. It is also rigorously true that at the extremes of S the HAB is either purely adaptive or purely superdirective. The results described later take all these factors into account by means of simulation.

The HAB 10 can be operated in two modes. The user can manually set the value of S via a user control 20 on the HAB 10, thereby determining the optimal tradeoff between adaptation and superdirectivity for the particular environment. In the automatic mode, the HAB 10 sets its own value of S. In this case S may be set to a value such as 1.0 (Hybrid mode) unless the HAB senses that it is in a low target-to-jammer ratio in a non-reverberant environment, in which case S may be set to 0.01 (mostly adaptive mode). The HAB may sense its environment by comparing the output of the superdirective beam (aimed at the target) to the average of the values of the other beams (aimed away from the target). If this ratio is low, the HAB 10 infers that it is in a non-reverberant low target-to-jammer environment and sets S=0.01. This method has worked reliably but other values of S may be used. In particular, inter-beam correlations provide a measure of reverberation in the environment and can be used to increase S in the presence of increased reverberation. As S is varied, the beam weighting coefficients are varied.

The HAB algorithm minimizes the beamformer output subject to the constraint that the response in the forward on-axis direction is 1.

We solve the following equation for the weight vector, w:

$$[R+S\ diag(O, R_{22}, R_{33}, R_{44}, R_{55})]w=d$$

where:

1) R is a 5×5 cross-spectral matrix for a frequency with elements Rij.
2) diag (O, $R_{22}$, $R_{33}$, $R_{44}$, $R_{55}$) is a diagonal matrix with O, $R_{22}$, $R_{33}$, $R_{44}$, $R_{55}$ on the diagonal.
3) w is the weight vector, and
4) d is a constraint vector whose elements are the values of the beampatterns of the 5 beams in the forward on-axis direction.

Acoustic situations were simulated by generating impulse responses from sources to microphones in rooms with various acoustic properties. Three simulated rooms were used of dimensions 5.2×3.4×2.8 meters. These rooms differed in the absorption coefficients of the walls which were 1.00, 0.60, and 0.20 for the three rooms. For the source and microphone locations used, these coefficients gave average direct-to-reverberant ratios of infinity, 5 dB, and −3 dB respectively. Deviations from these values for different sources and phones were fractions of a dB. These rooms will be called anechoic, mildly reverberant and reverberant, respectively. Inside each room, there was an array of five microphones approximately 2.5 cm. apart. The "target" source was on the axis of the array. The other sources ("jammers") were at angles of 45 and 120 degrees from the target as measured from the array axis. There was an additional array in each room at an angle of 10 degrees from the first array. The second array was used to simulate an array misaligned to the source. All the sources were approximately 1 meter from the arrays.

Various situations were simulated by using the three rooms and by turning various sources on and off and varying their relative intensities. Spoken sentences were used for the target and SPIN babble was used for the jammers. The sampling rate used was 20 KHz. The frequency band spanned was 250 Hz. to 4000 Hz.

The HAB 10 can adapt fully (adaptation time of small fractions of a second seems adequate, but longer times were used below). This means that the HAB 10 adaptively generates coefficients defining the beam that it used. These coefficients are based on both a target and a jammer. These coefficients are then used to process the target and the jammer individually. This allows us to compute the TJR at the output of the HAB 10. We then compare the TJR (target-to-jammer ratio) after going through the HAB 10 to the TJR before going through the HAB 10. By doing this for one-third octave bands and weighting the differences by the appropriate weights, the IWG's were produced.

This method produces the IWG by comparing the (target+target reverberant field) to (jammer+jammer reverberant field) ratios after and before the HAB 10. However, even with an infinite IWG as measured this way, the user might not understand speech output by the HAB because it might contain too much of the target reverberant field. To understand this factor quantitatively, we also ran the target reverberant field through the adapted HAB coefficients and computed the intelligibility weighted reduction in the target to target reverberant field ratio. We called this the IWG against own reverberation. The reverberant field was easy to isolate in our simulation because the direct field corresponds to a clearly demarcated spike (even when filtered) which can be cleanly removed from the target-phone impulse response.

As previously mentioned, the typical hearing-in-noise loss is 7 dB. The SNR needed to understand a single speaker against a single jammer (averaged over azimuth) for a normal is −8 dB. Therefore the typical subject will need −1 dB SNR to understand speech. Results will be presented in terms of Intelligibility Weighted Gain (IWG) against Target to Jammer Ratio (TJR) for various environments and conditions. One simple interpretation of the data is that a typical subject will understand speech when the sum of the IWG and TJR is equal to −1 dB or higher. This interpretation is useful but approximate because it does not take into account the differing effects of the azimuth of the jammer. An exact interpretation is that performance of our subject will be normal when the IWG is 7 dB or greater. While this is correct, it neglects the fact that frequently the subject's performance will be normal even if the IWG is less than 7. As an example, consider a TJR of 20 dB. Our subject's performance will be normal even in the absence of the HAB. To put it another way, for a high TJR, the signal-to-noise ratio is already high and therefore no hearing aid is needed. We will use primarily the first interpretation.

Noise in a reverberant environment is essentially diffuse and therefore performance against diffuse noise can be inferred from the numbers for reverberation rejection in a reverberant environment. It will be seen that it is on the order of a little more than 7 dB. As mentioned earlier, this is the typical hearing loss in noise. Therefore the HAB 10 can be expected to return the typical subject to normal in a purely diffuse noise environment. Performance against multiple point jammers is intermediate between that for a single point jammer and for a diffuse noise field.

Single point jammers are not only an instance of best performance, but also a very important practical case corresponding to the case of two people conversing with one of a number of nearby people also talking. Furthermore, since most adaptive arrays considered to date could not cancel more than one jammer (because they had too few microphones) it is of interest to present fairly complete data on case for comparison with previously considered designs.

Figure 3:
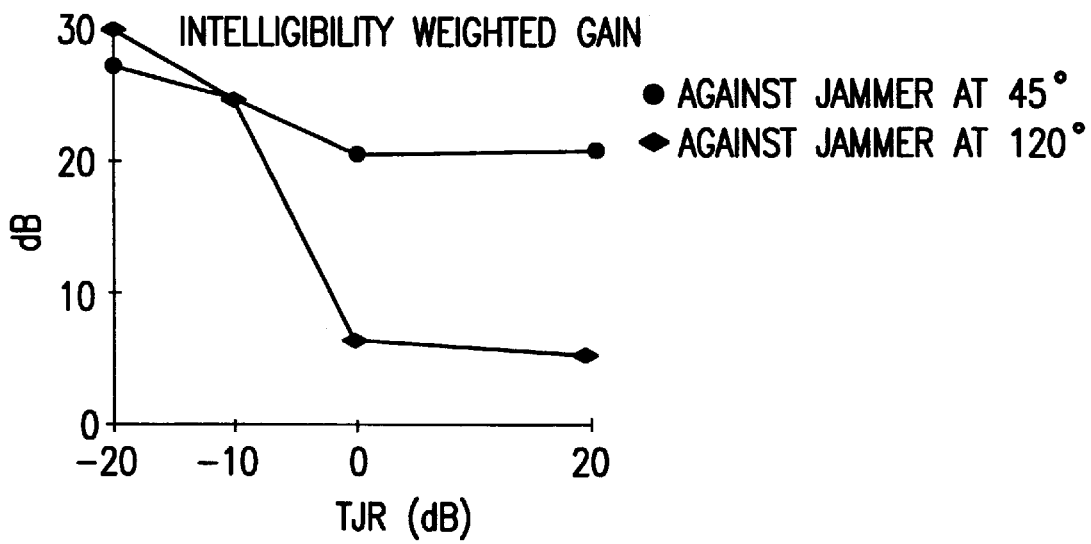
FIG. 3 is a graph illustrating intelligibility weighted gain in an anechoic room for the hybrid adaptive beamformer of the invention in an automatic mode.
Figure 4:
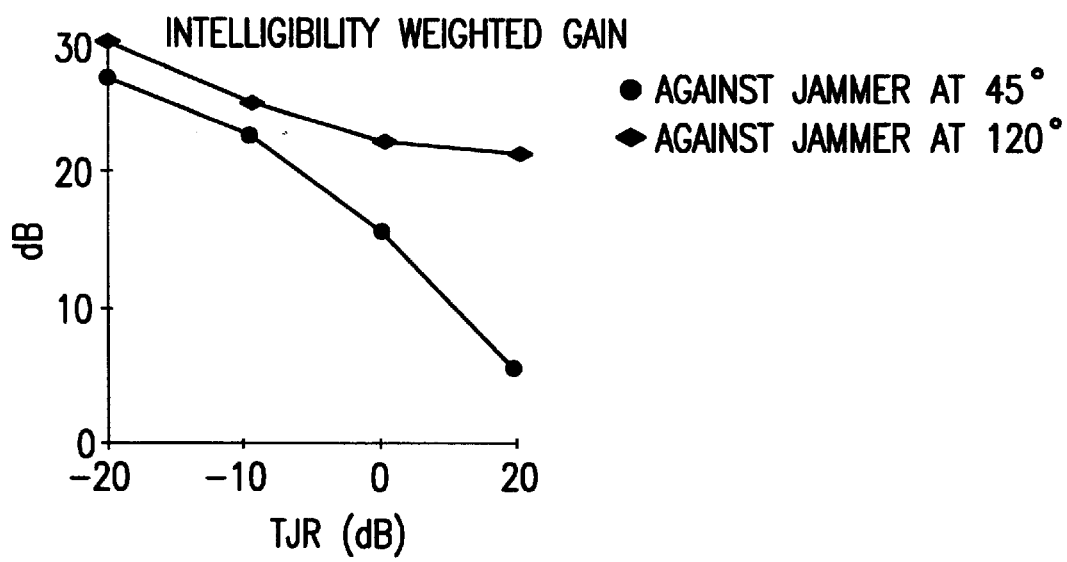
FIG. 4 is a graph illustrating intelligibility weighted gain in an anechoic room for the hybrid adaptive beamformer of the invention in a manual mode.

FIGS. 3 and 4 show performance in automatic and manual mode in an anechoic room against jammers at 45 and 120 degrees. The jammer at 120 degrees is more representative since the one at 45 has the privileged position of being near the target. The IWG for the jammer at 120 is never more than a tenth of a dB below 20 dB and goes as high as 30.0 dB. The performance for the jammer at 45 is worth discussion. The IWG is approximately 5 dB for both modes at a TJR of 20 dB. It gives a TJR at the HAB output of 25 dB. This is 26 dB more than the typical subject needs. The IWG at 0 dB TJR is 15.7 dB for manual mode and 6.3 dB for automatic. This gives the typical subject a margin of 7.3 dB in the automatic case.

Figure 5:
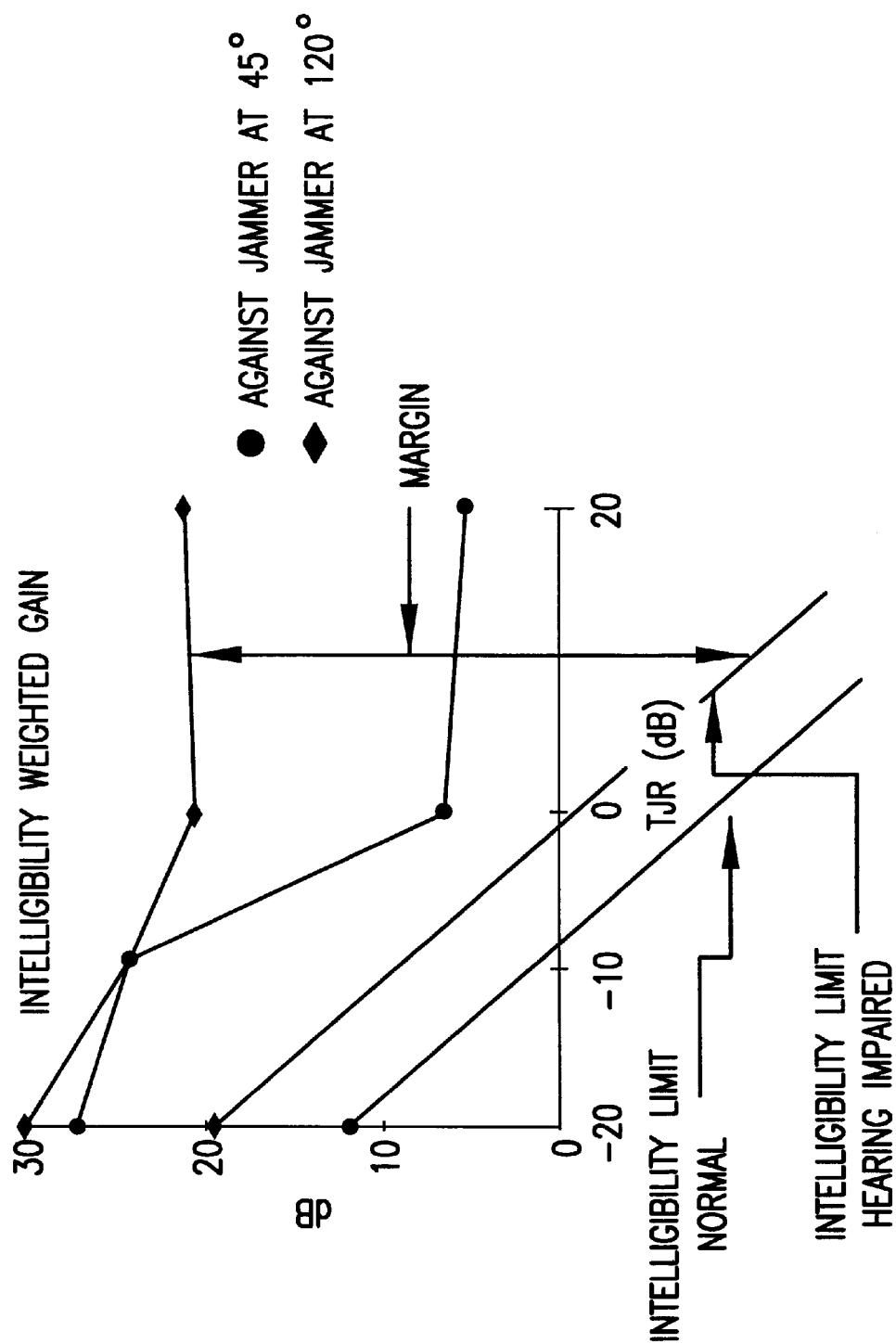
FIG. 5 is a graph illustrating hearing margins in intelligibility weighted gain for the hybrid adaptive beamformer of the invention.

To see this performance another way, consider FIG. 5. It is the same as FIG. 3 except that there are two slanted lines connecting y=19 with x −1, and y=12 with x=−8. Anything above the top line is understandable to the typical subject and anything above the lower line is understandable to the normal. The margin available is the vertical distance from these lines to the data plotted above them.

Thus, the typical subject using the HAB 10 can understand speech in all the conditions examined in an anechoic room with one jammer. This is dramatically better than the normal without the HAB who cannot understand speech at −10 or −20 dB TJR in any room.

Figure 7:
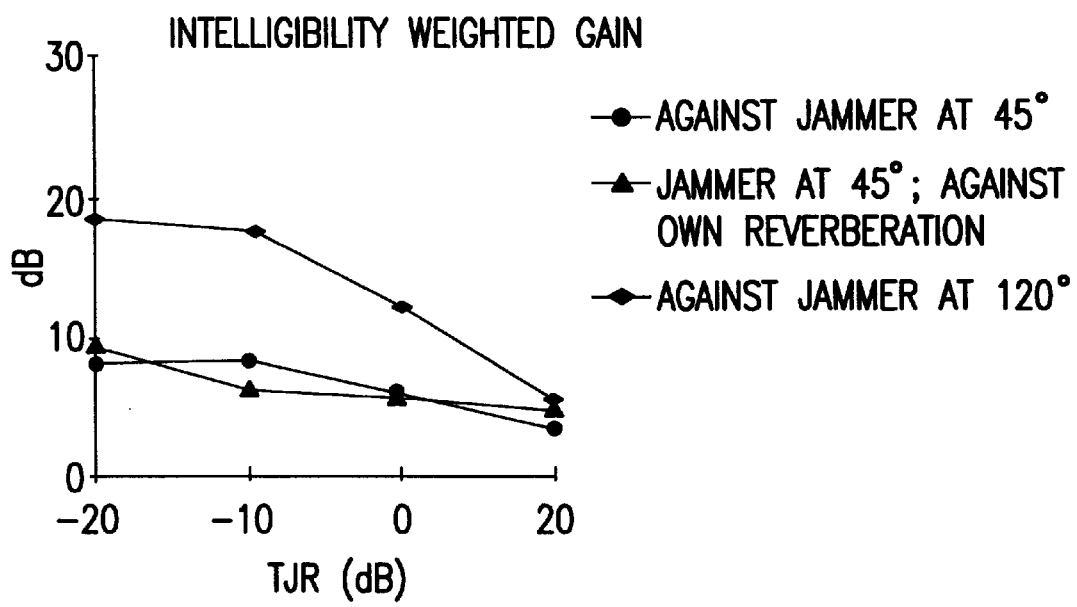
FIG. 7 is a graph illustrating intelligibility weighted gain in a mildly reverberant room for the hybrid adaptive beamformer of the invention in an automatic mode.
Figure 8:
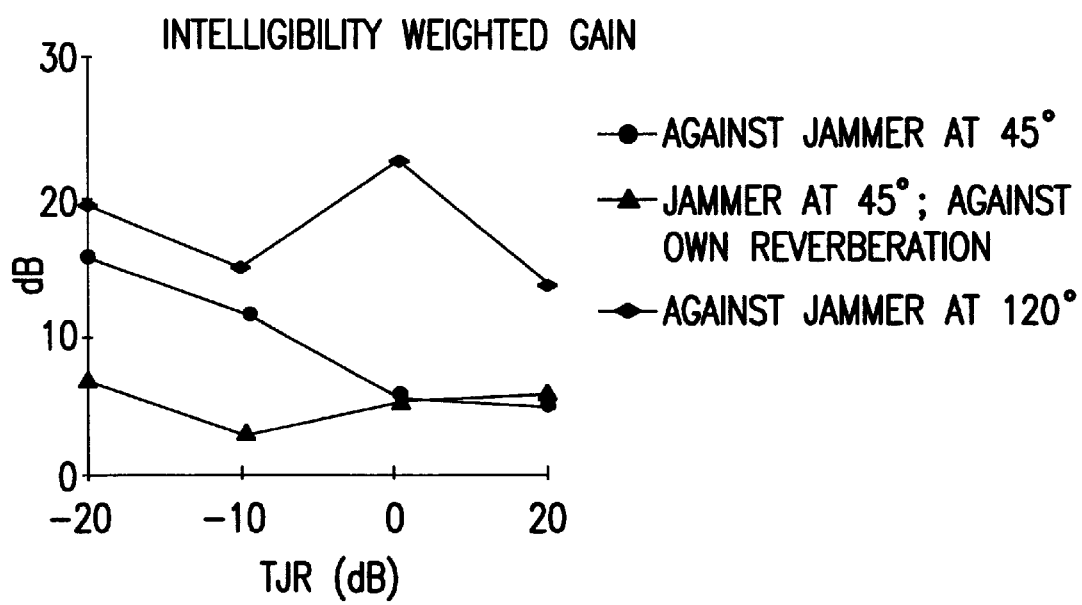
FIG. 8 is a graph illustrating intelligibility weighted gain in a mildly reverberant room for the hybrid adaptive beamformer of the invention in a manual mode.

A mildly reverberant room was simulated with a coefficient of absorption of the walls of 0.6. This gave an average (over sources and phones) direct to reverberant ratio of 5.0 dB. Performance in this room is shown in FIGS. 7 and 8. Performance against own reverberation was computed for both jammers individually, but was so similar that we plotted only the case of the jammer at 45 degrees. In the manual case, jammer rejection was optimized and own reverberation was allowed to fall where it may. The worst case own reverberation rejection was 3.2 dB which gave an 8.2 dB direct to own reverberation ratio at the HAB output. The typical case had a direct to own reverberation ratio of 10–12 dB at the HAB output. Thus, own reverberation is not a limitation for the typical subject in this room.

For the jammer at 120 degrees, the typical subject can understand speech in all conditions in the mildly reverberant room with understanding marginal for the −20 dB TJR condition. This situation has an IWG of 18.7 dB for the automatic case, which gives a margin of 0.3 dB, and the situation has an IWG of 19.1 dB for the manual case which gives a margin of 0.1 dB. For this jammer our subject's performance is substantially better than that of a normal without a HAB.

For the jammer at 45 degrees, neither the subject nor the normal can hear at TJR=−20 dB. The subject can hear better than the normal in automatic mode at TJR=−10 dB but is handicapped. The IWG is 8.3 dB which gives the subject a negative margin of −0.7 dB, compared to the normal's large negative margin of −2 dB without the HAB. In manual mode, the subject does 3.5 dB better than the normal with an IWG of 11.5 dB.

Figure 9:
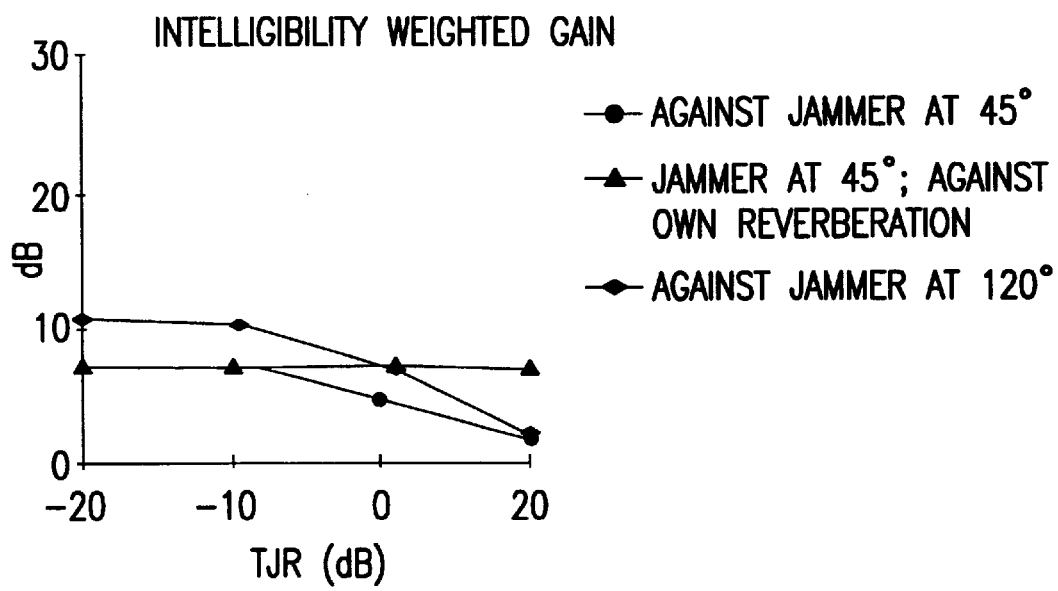
FIG. 9 is a graph illustrating intelligibility weighted gain in a reverberant room for the hybrid adaptive beamformer of the invention in an automatic mode.
Figure 10:
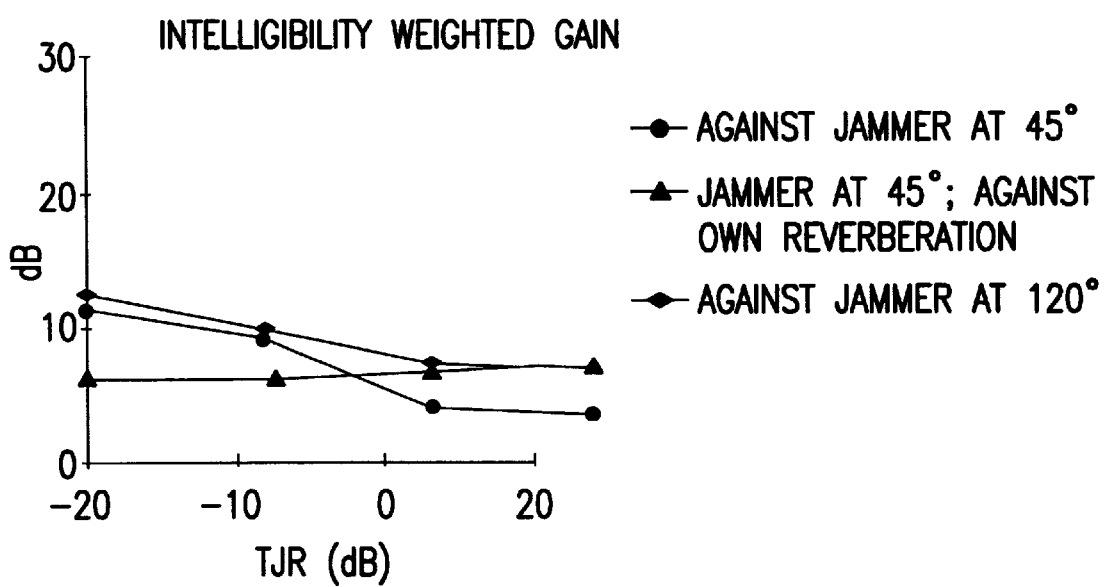
FIG. 10 is a graph illustrating intelligibility weighted gain in a reverberant room for the hybrid adaptive beamformer of the invention in a manual mode.

A reverberant room was simulated with a coefficient of absorption at the walls of 0.2. This gave an average direct to reverberant ratio of −3 dB. The performance in this room is shown in FIGS. 9 and 10. Again, gain against own reverberation depended only very weakly on the jammer present. For practical purposes it was 7 dB in all cases. This gave a direct to own reverberation ratio of 4 dB.

In all cases, no speech could be distinguished by anyone at a TJR=−20 dB. At −10 dB, the normal could not make out any speech. For a jammer at 120 degrees, the typical subject would get an SNR of 4 dB against own reverberation, and a margin of 1.4 dB against the jammer. For a jammer at 45 degrees, we can conclude that the subject would not make out speech since his SNR against own reverberation would be 4 dB and his margin against the jammer would be −1.7 dB in the automatic case, and 0.5 dB in the manual case. In the 0 dB TJR case, the subject would have a 4 dB SNR against own reverberation and a 4–8 dB margin against a jammer.

To determine the acceptable range of adaptation (the "S" variable), we performed a misalignment check. This entailed putting the target 10 degrees off the array axis, allowing the HAB 10 to adapt fully, running the signal only through the adapted HAB beam, and comparing the level of the signal with the level of the signal run through a HAB beam adapted to the target on the array axis. The difference is the loss in signal due to misalignment, and is the primary effect of misalignment. It is caused by the HAB 10 taking the target to be a jammer and trying to reject it. If this is small, we can conclude that other effects are even smaller. The worst case occurs in the anechoic room, since the HAB 10 can then concentrate on rejecting the target instead of trying to reject the reverberant field.

Figure 11:
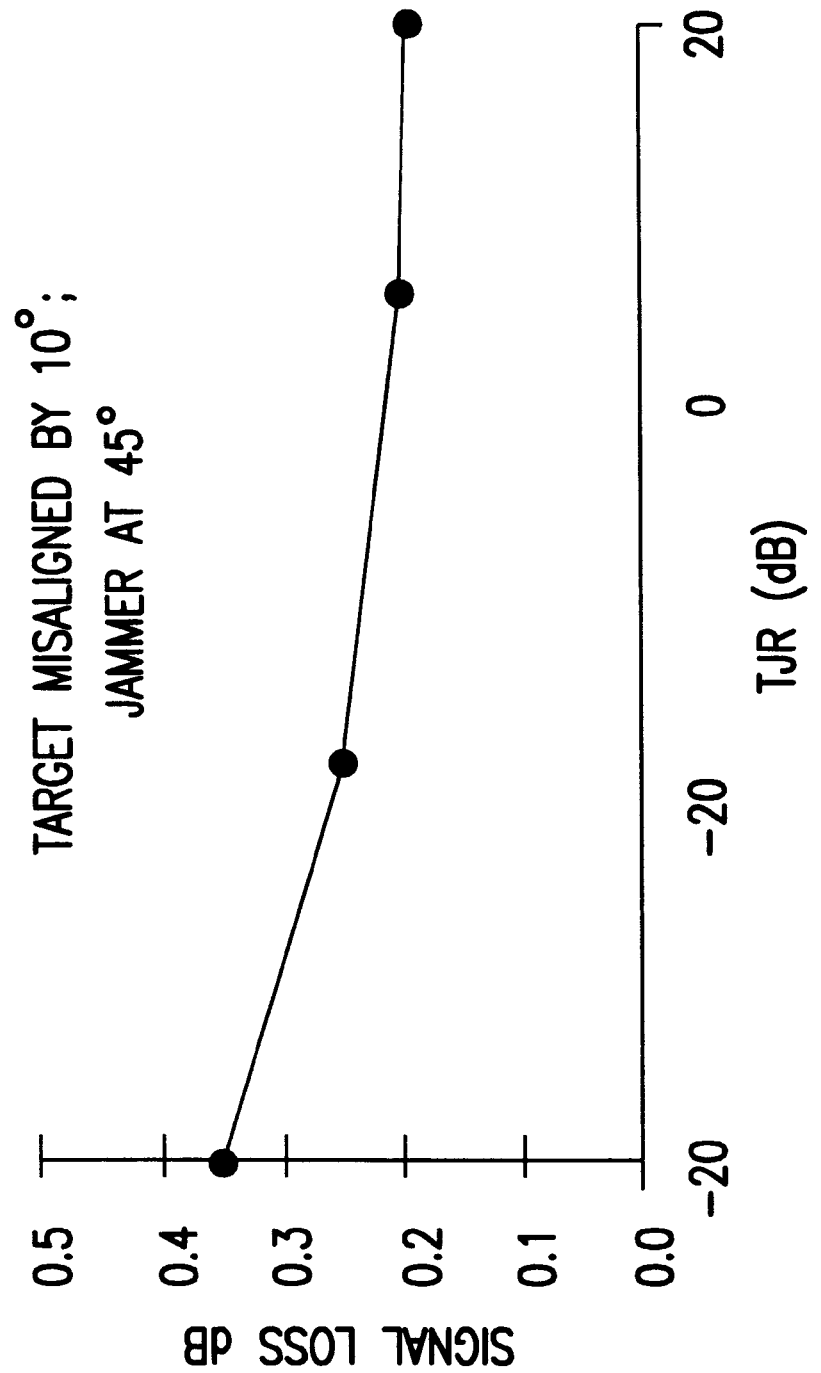
FIG. 11 is a graph illustrating signal loss for the hybrid adaptive beamformer of the invention in an automatic mode.

FIG. 11 shows the signal loss for the HAB 10 in automatic mode. It is clearly negligible. The signal losses at TJR's of 0 and 20 dB and an S of 0.01 were 0.39 and 1.03 dB respectively. At those large signal levels, these losses are also insignificant. The loss at TJR of 20 dB and S of 0.001 was about 0.5 dB. These numbers led to a preferred lower limit of 0.01 on S in the manual mode. This ensures that we only have small misalignment effects, as predicted, for misalignments up to 10 degrees.

Figure 12:
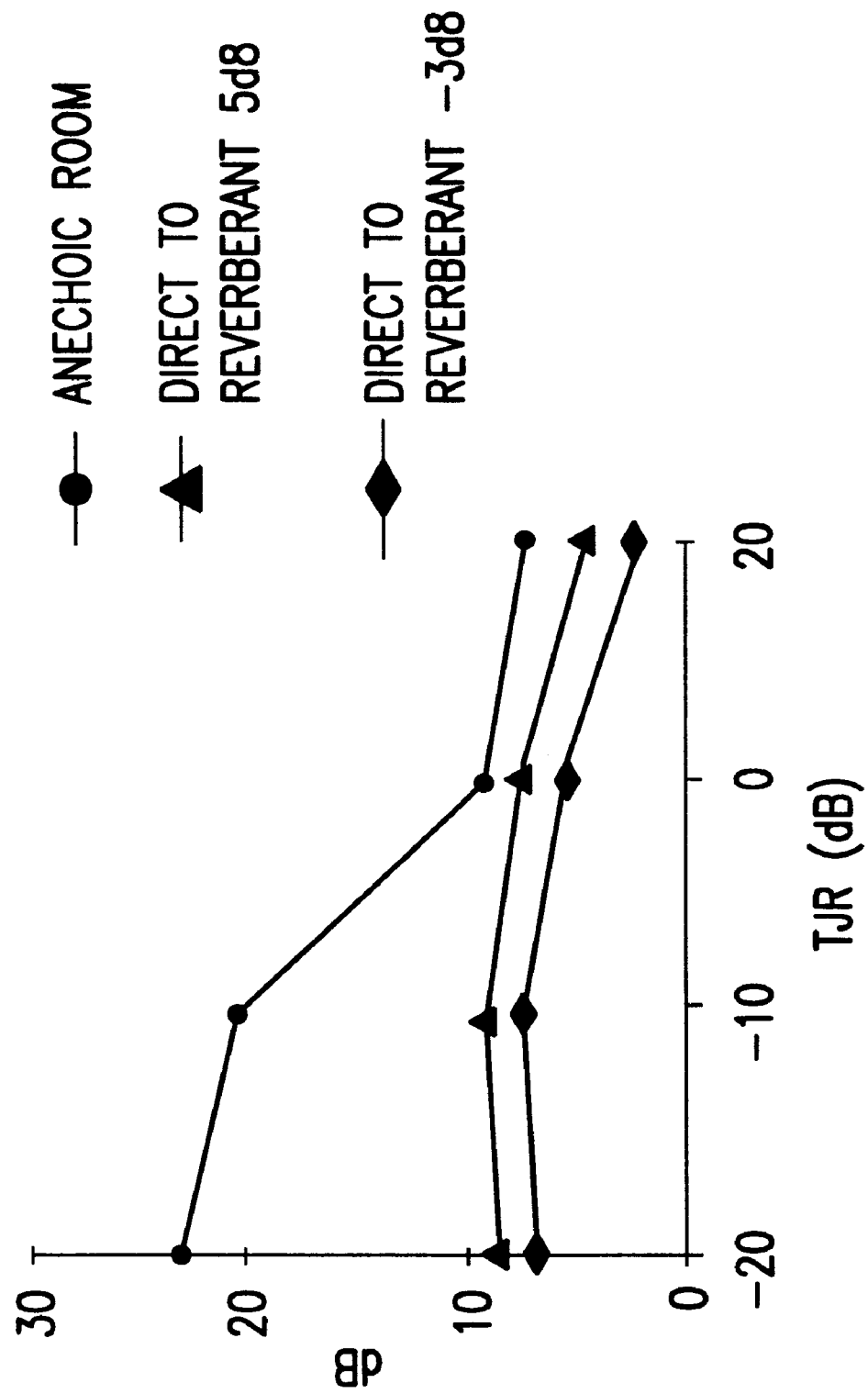
FIG. 12 is a graph illustrating intelligibility weighted gain in an anechoic room, in a mildly reverberant room and in a reverberant room for the hybrid adaptive beamformer of the invention in an automatic mode.

The HAB 10 was tried on multiple jammers (45 and 120 degrees from the array axis) as a demonstration of its ability to cancel multiple jammers. The HAB 10 can indeed cancel multiple jammers as shown in FIG. 12 for all three rooms. The HAB 10 is well-suited to canceling multiple jammers because the default beam partially cancels some jammers, leaving only those near the target to be canceled adaptively.

The HAB 10 was run with multiple jammers with one jammer at a time being turned on and off repeatedly. The only audible effect was the change in level of the jamming acoustic field. An adaptation time constant of 1.5 seconds was used. The varying jammer was turned on and off at intervals of 1 second and 6 seconds in different trials.

The HAB 10 functions well as an adaptive beamformer, equaling results of purely adaptive beamformers in environments where they excel (anechoic environments). The HAB 10 functions as a fixed weight beamformer in a reverberant environment equaling the performance of such a beamformer in environments where they excel. The HAB 10 demonstrated its ability to cancel multiple jammers. No adaptation noise was audible.

The HAB 10 may use typical plastic thick frame glasses such as illustrated in FIG. 1, which may have temples 0.75 cm. wide by 0.25 cm. thick. For instance, the Kobitone 25LMO48 microphone may be used and has a cylinder 0.500 cm in diameter and 0.25 cm in length. For aesthetic purposes, we would make a mold and embed this or a smaller phone into the temple. Six (5 signals and a ground) very thin (less than 30 gauge, again for purposes of aesthetics) wires would be strain relieved and connected to the microphones.

The processor 14 may have a low power acoustic processing system on a 3.8×12.5 cm. board with a 6 channel ADC, a DSP, RAM, PROM, and DAC.

Figure 13:
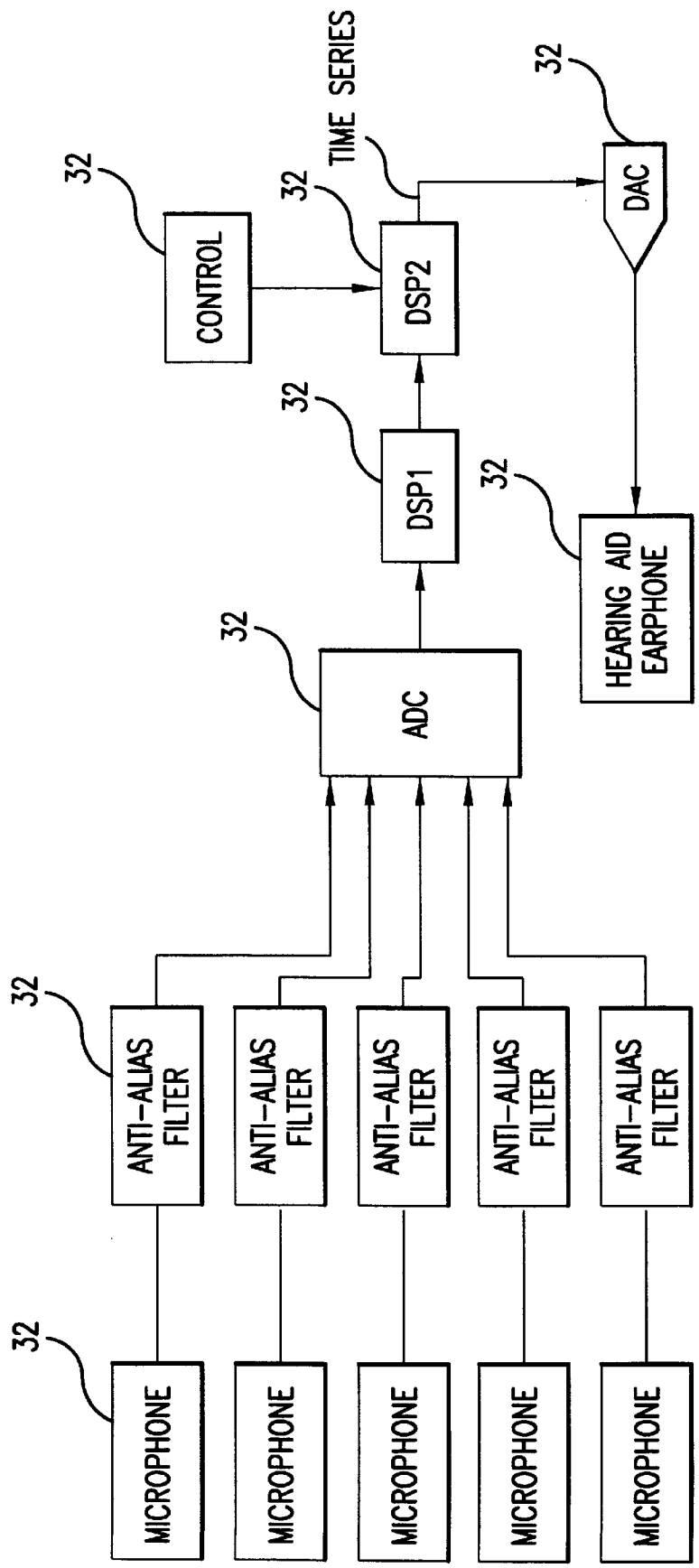
FIG. 13 is a diagram illustrating internal components of the hybrid adaptive beamformer of the invention.

The processor data flow between components is shown in FIG. 13 and should be compared with FIG. 2. The processing of FIG. 13 is all done in DSP1 except for the computation of the beam weighting coefficients which are done in DSP2. DSP1 and DSP2 are incorporated within the processor 14 of FIG. 1. The electronics are expected to weigh less than 100 g. The processor 14 could be powered by conventional batteries or by other means The processor 14 may include an on-off switch, and an infra-red communication interface 26 (like a TV remote control) for control inputs: field of view and adaptation for evaluating the utility of these controls. There may be a jack 18 for connecting a neck worn pickup loop, and a jack for connecting an existing hearing aid or earphones 24. The anti-alias filters 30 prevent high frequency signals, input to the ADC 32, from contaminating the lower frequency output of ADC 32 via "aliasing". Aliasing is a phenomenon well-known to those of skill in the art, and the use of anti-aliasing filters in such an application is normal practice. A digital interface may be provided for entering data as well as for retrieving monitoring data stored by the processor.

ADC 32 is an analog-to-digital converter which converts the microphone outputs to digital signals for further processing. The DAC 34 is a digital-to-analog converter which converts the processed digital signal from DSP2 to an analog signal for output to a conventional earphone or hearing aid. DAC 34 may not be required if a digital hearing aid is used.

We now consider computational load. We assume a 16 KHz sampling rate. The items contributing significantly to the computational load for DSP1 are then:

1) FFT Computations=5 channels×16 KHz/channel×2 FFT's per point×29 operations per point
=4.8×106 operations/second
=4.8 Megaflops 2) Beamforming=5 beams×32 KHz×4 operations/point
=0.7 Megaflops 3) CSM computation=12 operations/input point×32 KHz
=0.39 Megaflops for a total of 5.9 Megaflops. This is perfectly reasonable for a single DSP.

The primary operation of DSP2 is to solve 5 complex linear equations for each coefficient update for each of 59 frequencies. For a 40 million instructions per second processor and an update rate of ten per second, this gives a budget of 68,000 instructions per set of equations.

While the preferred embodiments of the invention are described in detail herein, with specific reference to certain illustrative embodiments, it is to be understood that there is no intent to be limited to those embodiments. On the contrary, the aim is to cover all modifications, alternatives and equivalents falling within the spirit and scope of the invention.

What is claimed is:

1. A hybrid adaptive beamformer comprising:
   a plurality of microphones for receiving sound energy from an external environment and for producing a plurality of microphone outputs based on the sound energy; and
   a processor producing a plurality of first order beams based on the microphone outputs, the processor determining an amount of reverberation in the external environment and adaptively producing a second order output beam based on the determined amount of reverberation.

2. The hybrid adaptive beamformer of claim 1, wherein the processor determines the amount of reverberation based on a comparison of the plurality of first order beams.

3. The hybrid adaptive beamformer of claim 2, wherein each of the plurality of first order beams has a sensitivity different from other ones of the plurality of first order beams in a given direction.

4. The hybrid adaptive beamformer of claim 1, wherein the processor produces the second order output beam by adaptively combining the plurality of first order beams.

5. The hybrid adaptive beamformer of claim 1, wherein the processor produces the second order output beam by adaptively combining the microphone outputs.

6. The hybrid adaptive beamformer of claim 1, wherein the plurality of first order beams include a default beam and at least one correction beam, and the processor adaptively produces the second order output beam by determining a plurality of weightings based on the determined amount of reverberation, and combining the weightings with the at least one correction beam and with the default beam.

7. The hybrid adaptive beamformer of claim 6, further comprising a user input connected to the processor, the user input allowing the user to override the amount of adaptation and to set the amount of adaptation to a desired value.

8. A method of producing a second order output beam with a hybrid adaptive beamformer, comprising:

receiving sound energy with a plurality of microphones from an external environment and producing a plurality of microphone outputs based on the sound energy;

producing a plurality of first order beams based on the microphone outputs;

determining an amount of reverberation in the external environment and adaptively producing a second order output beam based on the determined amount of reverberation.

9. The method of claim 8, wherein the step of determining an amount of reverberation comprises comparing the plurality of first order beams.

10. The method of claim 8, wherein each of the plurality of first order beams has a sensitivity different from other ones of the plurality of first order beams in a given direction.

11. The method of claim 8, wherein producing the second order output beam comprises adaptively combining the plurality of first order beams.

12. The method of claim 8, wherein producing the second order output beam comprises adaptively combining the microphone outputs.

13. The method of claim 8, wherein producing the plurality of first order beams comprises producing a default beam and at least one correction beam, and producing the second order output beam comprises determining a plurality of weightings based on the determined amount of reverberation, and combining the weightings with the at least one correction beam and with the default beam.

14. The method of claim 13, further comprising overriding the determined amount of reverberation S and setting S to a desired value.

15. A hybrid adaptive beamformer comprising:

a plurality of microphones for receiving sound energy from an external environment and for producing a plurality of microphone outputs based on the sound energy; and a processor producing a plurality of first order beams based on the microphone outputs, the processor determining at least one of an amount of reverberation in the external environment and a signal-to-noise ratio, the processor adaptively producing a second order output beam based on the determined at least one of the amount of reverberation and the signal-to-noise ratio, wherein the processor produces the second order beam by combining the first order beams if the signal-to-noise ratio is used.

16. The hybrid adaptive beamformer of claim 15, wherein the processor determines the amount of reverberation based on a comparison of the plurality of first order beams.

17. The hybrid adaptive beamformer of claim 15, wherein if the processor produces the second order output beam based on the amount of reverberation, the processor produces the second order output beam by determining a plurality of weightings based on the determined amount of reverberation, and combining the plurality of first order beams with the plurality of weightings.

18. The hybrid adaptive beamformer of claim 15, wherein the plurality of first order beams comprise at least one correction beam and a default beam.

19. The hybrid adaptive beamformer of claim 17, further comprising a user input connected to the processor, the user input allowing the user to override the amount of adaptation and to set the amount of adaptation to a desired value.

20. A hybrid adaptive beamformer comprising:

a plurality of microphones for receiving sound energy from an external environment and for producing a plurality of microphone outputs based on the sound energy; and a processor producing a plurality of first order beams based on the microphone outputs, the processor determining a signal-to-noise ratio, the processor producing a second order output beam by adaptively combining the first order beams based on the determined signal-to-noise ratio.

21. The hybrid adaptive beamformer of claim 20, wherein the plurality of first order beams comprise at least one correction beam and a default beam, the processor produces the second order output beam by determining a plurality of weightings based on the determined signal-to-noise ratios of the first order beams and combining the weightings with the at least one correction beam and with the default beam.

22. The hybrid adaptive beamformer of claim 20, further comprising a user input connected to the processor, the user input allowing the user to override the determined amount of reverberation and to set S to a desired value.

* * * * *

UNITED STATES PATENT AND TRADEMARK OFFICE
CERTIFICATE OF CORRECTION

PATENT NO. : 6,154,552
DATED : November 28, 2000
INVENTOR(S) : Walter S. Koroljow et al.

It is certified that error appears in the above-identified patent and that said Letters Patent is hereby corrected as shown below:

Column 5,
Line 30, change "preferred' transform" to -- preferred transform --

Column 6,
Line 38, change "$w^i$" to -- $w_i$ --.

Column 14,
Line 42, change "amount of" to -- signal to --.
Line 43, change "reverberation" to -- signal-to-noise ratio --.

Signed and Sealed this

Thirtieth Day of October, 2001

*Attest:*

NICHOLAS P. GODICI
*Attesting Officer*  Acting Director of the United States Patent and Trademark Office